UNITED STATES PATENT OFFICE 2,372,540

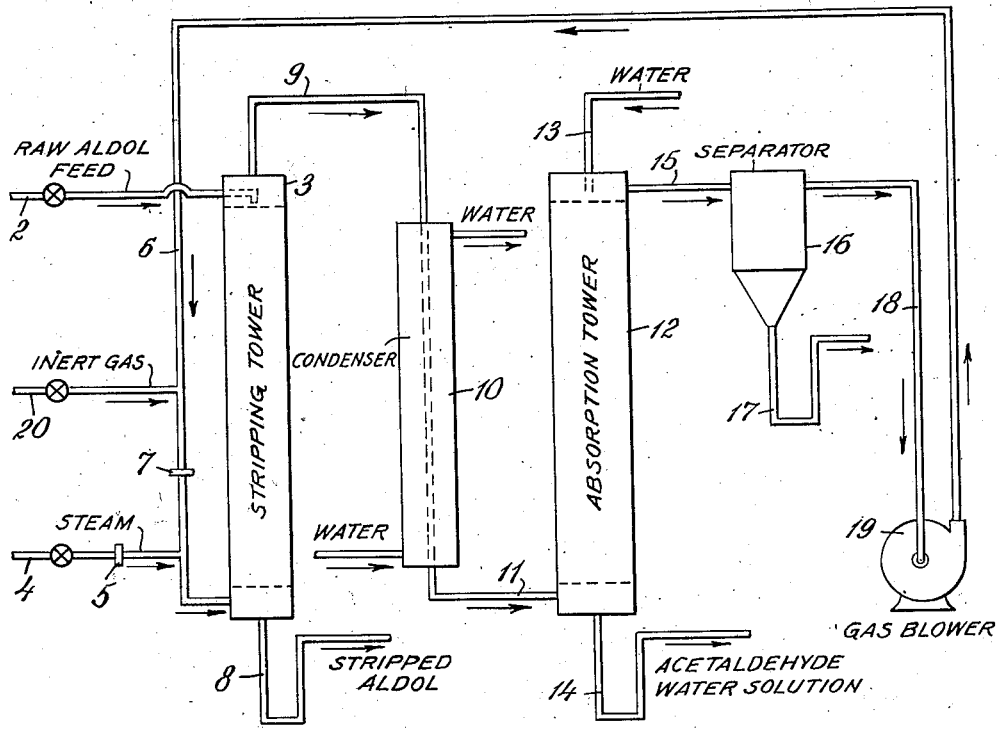

PREPARATION OF ALDOL

Frederick R. Balcar, Stamford, Conn., assignor to Air Reduction Company, Incorporated, New York, N. Y., a corporation of New York Application May 13, 1943, Serial No. 486,839

10 Claims. (Cl. 202—49)

This invention relates to an improvement in the preparation of aldol and more specifically to an improved method for the continuous separation of unreacted acetaldehyde from crude aldol.

This application is a continuation-in-part of my application Ser. No. 479,772 filed March 19, 1943.

In the preparation of aldol by the condensation of acetaldehyde according to the reaction

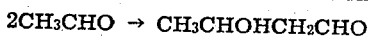

$$2CH_3CHO \rightarrow CH_3CHOHCH_2CHO$$

it is generally considered better not to attempt to condense all the aldehyde to aldol but instead to allow the reaction to cease while substantial amounts of the acetaldehyde remain unconverted, or in recoverable form. The crude aldol therefore is a mixture containing aldol, recoverable acetaldehyde, and the condensation catalyst along with water which may have been added with the condensation catalyst or by dilution of the acetaldehyde.

When the aldol is to be subjected to further chemical reaction, for example as in the hydrogenation of aldol to produce 1,3-butylene glycol which in turn may be dehydrated to 1,3-butadiene, the presence of unreacted acetaldehyde is undesirable and its removal becomes an essential step in such process. The acetaldehyde is undesirable because during the hydrogenation of aldol it will be hydrogenated to ethyl alcohol, thus reducing the over-all economy of the aldol preparation. Furthermore the hydrogenation of the acetaldehyde liberates a considerable amount of heat which is undesirable since it necessitates provision for greater cooling and may at times cause such an undue temperature rise as to cause undesirable secondary reactions to take place.

It has been customary heretofore wherever such removal of acetaldehyde is contemplated to use methods whereby both the water present in the crude aldol as well as the unchanged acetaldehyde are removed. Such procedure results in the preparation of highly concentrated aldol which, due to its tendency toward polymerization, forms paraldol, a solid having a melting point of about 82° C. Where the aldol, so purified, does not form a solid phase, there results a very viscous solution, presumably of paraldol dissolved in aldol. Such viscous solutions or solids are difficult to handle in the ensuing steps such as hydrogenation, for example, and it is usually necessary to add water to the concentrated aldol in order to make it more fluid so that it may be readily pumped as for example into a continuous hydrogenation apparatus.

There are further disadvantages occurring when both aldehyde and water are removed from the crude aldol. If steam at or above atmospheric pressure is used to effect such removal, the crude aldol is subjected to a higher temperature than is desirable and as a result there may be accompanying dehydration of the aldol to form crotonaldehyde in substantial amounts. The crotonaldehyde formed represents a loss of acetaldehyde and results therefore in a decreased yield of aldol from the acetaldehyde. In addition to crotonaldehyde, there is generally a production of high boiling impurities.

To avoid subjecting the crude aldol to an unduly high temperature, resort is generally had to the removal of the acetaldehyde under reduced pressure. This operation is more costly due to the power requirements for the production of the reduced pressure and has the further disadvantage that complete and economical recovery of the low boiling acetaldehyde in such operation is difficult to achieve.

It is the object of the present invention to avoid the difficulties mentioned and to afford a simple, economical and effective method of separating and recovering acetaldehyde from crude aldol.

Other objects and advantages of the invention will be apparent as it is better understood by reference to the following specification and accompanying drawing, illustrating diagrammatically an apparatus suitable for the practice of the method.

I have discovered that it is possible to remove the unreacted acetaldehyde from crude aldol at normal atmospheric pressures and in such a manner that the aldol is at no time subjected to elevated temperatures sufficient to cause dehydration of the aldol or formation of other undesirable products. The method permits continuous removal of acetaldehyde from crude aldol and is characterized by the use as a stripping agent of steam diluted with such an amount of an inert gas that the resulting steam-gas mixture has a dew point not higher than the maximum temperature to which the crude aldol is to be subjected.

I have also discovered that side reactions tending to produce crotonaldehyde, resinous products and other undesirable impurities can be avoided by neutralizing the crude aldol to a point between pH 5.0 and pH 7.0 and preferably between pH 6.0 and pH 7.0 prior to stripping.

The application of this method to crude aldol results in the complete or substantially complete removal of the acetaldehyde with little or no removal of the water contained in such crude aldol. There may even be a slight gain in the amount of water in the product prepared according to my invention, over that originally present in the crude aldol. The resulting aldol is a limpid liquid showing no tendency to crystallize at ordinary temperatures or to become so viscous as to impair the ease with which it may be pumped or otherwise handled. It is also free from appreciable amounts of crotonaldehyde and/or high boilers and is well adapted for hydrogenation to 1,3-butylene glycol with good yields. The following description will show in greater detail a method of carrying out my invention:

Crude aldol containing unreacted acetaldehyde and water is first neutralized by the addition of a suitable acid, such as sulphuric, hydrochloric or acetic acid, to a pH within the range of 5.0 to 7.0 and is fed through pipe 2 to the top of stripping tower 3 which may be a tower packed with ferrules, raschig rings and the like, or a bubble-cup column or similar device. Steam is supplied through valved line 4 and measured by orifice 5 and is mixed with the proper amount of an inert gas supplied through valved line 6 and measured by means of orifice 7. Any gas may be used for dilution of the steam provided that it is inert or incapable of reacting with any of the organic materials present and whose physical characteristics would adapt it to the purpose of the invention. Thus nitrogen, carbon dioxide, natural gas, combustion gases, if free from oxygen, or any similar gases may be employed. The steam-inert gas mixture is fed into the lower end of tower 3 where it passes upward counter-current to the descending crude aldol. The stripped aldol leaves the tower through pipe 8 equipped with a liquid seal.

The condensed steam furnishes an amount of heat sufficient to volatilize all or substantially all of the acetaldehyde, which in admixture with the inert gas and small amounts of water vapor leave the stripping tower through line 9, passing to a water-cooled condenser 10 which may be of any suitable construction such as a water jacketed pipe or pipes or a coil cooled by a suitable bath. The greater part of the water vapor and a portion of the acetaldehyde is condensed herein and the total liquid and gaseous products issuing from the condenser through pipe 11 are fed into the lower portion of absorbing tower 12, which may be a packed tower, bubble-cap column or the like as in the case of stripping tower 3. The use of condenser 10 is not essential to the operation of the invention and if desired the gases from stripping tower 3 may be introduced directly into absorbing tower 12 without being passed through condenser 10.

Water is fed through line 13 into the upper part of the absorbing tower 12 where it passes downward through the tower. The aqueous solution of acetaldehyde formed in the absorbing tower 12 leaves through pipe 14 equipped with a liquid seal. The inert gas escapes from the upper part of absorbing tower 12 through pipe 15, passes for removal of entrained water through separator 16 equipped with water seal 17, then through line 18 into blower 19, and from the blower is returned to scrubbing tower 3 through line 6. After the cycle is in operation, any loss of inert gas from the cycle may be made up by feeding added inert gas from any suitable supply through valved line 20.

The acetaldehyde-water mixture withdrawn through pipe 14 may be further processed by suitable means such as distillation for recovery of the acetaldehyde contained therein for further conversion to aldol.

The stripping of acetaldehyde from the crude aldol in the tower 3 may be carried out over a wide temperature range, but it has been found especially advantageous to operate between about 60° to about 80° C. At temperatures substantially above 80° C. there is danger of the formation of crotonaldehyde and/or high boiling products. At temperatures much below 60° C. the removal of acetaldehyde becomes slower and it is generally not commercially feasible to operate at such low temperatures.

In order for the steam to heat and vaporize the acetaldehyde without exceeding the desired temperature of operation, it is essential that the steam-gas mixture be saturated with respect to water vapor at the desired operating temperature. The following table indicates the amount of steam required for saturation of 100 cubic feet of nitrogen for various operating temperatures. The nitrogen volume is measured at the temperature of the mixture.

| | Operating temp., °C. | | | |
|---|---|---|---|---|
| | 60 | 70 | 75 | 80 |
| Lbs. steam required/100 cu. ft. nitrogen | 1.06 | 1.83 | 2.47 | 3.47 |

The following examples illustrate the results obtained by operation by this improved method when applied in an apparatus similar to that described above and having a scrubbing tower two and one-half inches in diameter and filled for about eleven feet of its length with one-half inch ceramic ferrules. The absorption tower for recovery of the acetaldehyde was three inches in diameter and was filled with similar ferrules for about eleven feet of its length. The examples show the results obtained at two different rates of feed.

| | Example 1 | Example 2 |
|---|---|---|
| Crude aldol feed.................lbs./hr.. | 3.52 | 11.03 |
| Steam feed.......................lbs./hr.. | 3.9 | 10.7 |
| Nitrogen feed....................cu. ft./hr. | 112 | 241 |
| Temp. of stripping operation.........°C.. | 70 | 76 |
| Percent acetaldehyde removed from crude aldol................................ | 86 | 79.2 |

Various changes may be made in the details of the apparatus and procedure without departing from the invention or sacrificing the advantages thereof.

I claim:

1. The method of separating acetaldehyde from a mixture containing acetaldehyde and aldol which comprises subjecting the mixture to the action of steam diluted with sufficient inert gas to afford a dew point between 60° and 80° C.

2. The method of separating acetaldehyde from a mixture containing acetaldehyde and aldol which comprises subjecting the mixture to the action of steam diluted with sufficient nitrogen to afford a dew point between 60° and 80° C.

3. The method of separating acetaldehyde from a mixture containing acetaldehyde and aldol which comprises subjecting the mixture to the action of steam diluted with sufficient carbon dioxide to afford a dew point between 60° and 80° C.

4. The method of separating acetaldehyde from a mixture containing acetaldehyde and aldol which comprises subjecting the mixture to the action of steam diluted with sufficient natural gas to afford a dew point between 60° and 80° C.

5. The method of separating acetaldehyde from a mixture containing acetaldehyde and aldol which comprises subjecting the mixture to the action of steam diluted with sufficient nitrogen to afford a dew point between 60° and 80° C., washing acetaldehyde from the inert gas with water and returning the inert gas with admixed steam for further use in the treatment of the acetaldehyde-aldol mixture.

6. The method of separating acetaldehyde from a mixture containing acetaldehyde and aldol which comprises subjecting the mixture to the action of steam diluted with sufficient carbon dioxide to afford a dew point between 60° and 80° C., washing acetaldehyde from the inert gas with water and returning the inert gas with admixed steam for further use in the treatment of the acetaldehyde-aldol mixture.

7. The method of separating acetaldehyde from a mixture containing acetaldehyde and aldol which comprises subjecting the mixture to the action of steam diluted with sufficient inert gas to afford a dew point between 60° and 80° C., washing acetaldehyde from the inert gas with water and returning the inert gas with admixed steam for further use in the treatment of the acetaldehyde-aldol mixture.

8. The method of separating acetaldehyde from a mixture containing acetaldehyde and aldol which comprises first neutralizing the mixture to a pH within the range of 5.0 to 7.0 and subjecting the mixture to the action of steam diluted with sufficient carbon dioxide to afford a dew point between 60° and 80° C.

9. The method of separating acetaldehyde from a mixture containing acetaldehyde and aldol which comprises first neutralizing the mixture to a pH within the range of 5.0 to 7.0, and subjecting the mixture to the action of steam diluted with sufficient inert gas to afford a dew point between 60° and 80° C.

10. The method of separating acetaldehyde from a mixture containing acetaldehyde and aldol which comprises first neutralizing the mixture to a pH within the range of 5.0 to 7.0, and subjecting the mixture to the action of steam diluted with sufficient nitrogen to afford a dew point between 60° and 80° C.

FREDERICK R. BALCAR.